3,155,570
Patented Nov. 3, 1964

3,155,570
SYNERGISTIC MIXTURE OF PARATHION AND ITS ORTHO-ISOMER
Gerhard Schrader, Wuppertal - Cronenberg, Germany, assignor to Farbenfabriken Bayer Aktiengesellschaft, Leverkusen, Germany, a corporation of Germany
No Drawing. Filed June 19, 1962, Ser. No. 203,467
Claims priority, application Germany July 7, 1961
2 Claims. (Cl. 167—30)

The present invention relates to and has as its objects new and useful mixtures of insecticidal thiophosphoric acid esters with outstanding insecticidal properties.

Generally the new inventive mixtures consist of Parathion and its o-isomer.

It is known that O,O-diethyl- or O,O-dimethyl-O-p-nitrophenyl thionophosphate (parathione or methylparathione) are excellent pest control agents. It is, moreover, known that the corresponding o-nitro compounds, i.e., the O,O-diethyl-, or O,O-dimethyl-o-nitrophenyl thionophosphate, possess, at about equal toxicity towards warm-blooded animals, a substantially smaller activity against insect pests. The relations are shown in the following table:

| Compound | Killing of aphids (M. persicae) after 24 hours | |
|---|---|---|
| | Percent | Percent |
| $C_2H_5O$\P(=S)-O-C_6H_4-NO_2 (para) / $C_2H_5O$ | 0.02<br>0.004<br>0.0008<br>0.00016 | 100<br>100<br>100<br>10 |
| $C_2H_5O$\P(=S)-O-C_6H_4-NO_2 (ortho) / $C_2H_5O$ | 0.02<br>0.004<br>0.0008<br>0.00016 | 98<br>15<br>0<br>0 |

It has now surprisingly been observed that new active agents are obtained by combining the para- and ortho-compounds which show the same insecticidal activity as the pure paracompounds.

The mixing proportion within which the unexpected activity increase has been ascertained amounts to at least about one part of para-compound per part of ortho-compound. If more of the ortho-compound is present in the mixture of active agents according to the invention, the activity decreases more strongly so that no products of practical interest are obtained. If less than 20% of ortho-compound are present in the inventive mixture, the synergistic effect is only of minor importance so that this represents about the lower limit of ortho-compound.

In the following the proportions of the activity of a mixture of 50% of ortho- and 50% of para-compound (I) is compared with pure para-compound (II) of the O,O-diethyl-O-nitrophenyl thiono-phosphate.

| Compound | Aphids (M. persicae) killed after 24 hours | |
|---|---|---|
| | Percent | Percent |
| I | 0.02<br>0.004<br>0.0008<br>0.00016 | 100<br>100<br>100<br>0 |
| II | 0.02<br>0.004<br>0.0008<br>0.00016 | 100<br>100<br>100<br>10 |

The present invention is of great technical interest. As is well known, the preparation of para-nitrophenol yields at first a mixture of para- and ortho-compound. Hitherto, the ortho-nitrophenol had to be separated from the para-compound by a cumbersome and time-consuming process.

According to the present invention a raw product consisting of about 50%–80% of para- and 20%–50% of ortho-nitrophenol can be used immediately for the production of parathione-like compounds, without a reduction of the insecticidal activity taking place. The establishment of the synergistic activity of the ortho-compound and the para-compound thus gives rise to an essential simplification of the technical production of pest control agents which contain parathione and methyl-parathione.

I claim:
1. A pest control composition containing an effective amount of a mixture of (A) a component selected from the group consisting of (1) O,O-diethyl-O-p-nitrophenyl thionophosphate and (2) O,O-dimethyl-O-p-nitrophenyl thionophosphate and (B) A component selected from the group consisting of (1) O,O-diethyl-o-nitrophenyl thionophosphate and (2) O,O-dimethyl-o-nitrophenyl thionophosphate wherein the ratio of A to B is about 1:1 parts by weight.

2. A pest control composition containing an effective amount of a mixture of O,O-diethyl-O-p-nitrophenyl thionophosphate, and O,O-diethyl-o-nitrophenyl thionophosphate in the proportions by weight of about 1:1.

References Cited in the file of this patent
UNITED STATES PATENTS
2,520,393    Fletcher _____ Aug. 29, 1950
2,605,279    Edwards et al. _____ July 29, 1952